United States Patent
Sato et al.

(10) Patent No.: US 10,086,826 B2
(45) Date of Patent: Oct. 2, 2018

(54) CONTROL DEVICE FOR HYBRID VEHICLE

(71) Applicant: Mitsubishi Jidosha Kogyo Kabushiki Kaisha, Tokyo (JP)

(72) Inventors: Takuya Sato, Okazaki (JP); Shigetoshi Hirano, Toyoake (JP); Tadayoshi Hirao, Okazaki (JP); Takahiro Oguma, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 15/225,939

(22) Filed: Aug. 2, 2016

(65) Prior Publication Data

US 2017/0050633 A1 Feb. 23, 2017

(30) Foreign Application Priority Data

Aug. 18, 2015 (JP) .................. 2015-161221

(51) Int. Cl.
*B60K 15/035* (2006.01)
*B60W 20/15* (2016.01)
(Continued)

(52) U.S. Cl.
CPC ............... *B60W 20/15* (2016.01); *B60K 6/46* (2013.01); *B60K 11/02* (2013.01); *B60K 15/03504* (2013.01); *B60K 15/03519* (2013.01); *B60W 10/06* (2013.01); *B60W 10/08* (2013.01); *B60W 20/10* (2013.01); *B60W 30/1843* (2013.01); *B60K 2015/03302* (2013.01); *B60W 2050/009* (2013.01); *B60W 2510/0676* (2013.01); *B60W 2710/0677* (2013.01); *Y02T 10/6217* (2013.01);
(Continued)

(58) Field of Classification Search
CPC .. B60W 20/15; B60W 20/10; B60W 30/1843; B60W 10/08; B60W 10/06; B60W 2510/0676; B60K 6/46; B60K 11/02
See application file for complete search history.

(56) References Cited

U.S. PATENT DOCUMENTS

| | | | |
|---|---|---|---|
| 2002/0165660 A1* | 11/2002 | Boggs | B60K 6/445 701/112 |
| 2004/0211381 A1* | 10/2004 | Ogawa | B60H 1/04 123/179.4 |
| 2013/0174813 A1 | 7/2013 | Miyata et al. | |

FOREIGN PATENT DOCUMENTS

JP 2013-139751 A 7/2013

* cited by examiner

*Primary Examiner* — Alan D Hutchinson
(74) *Attorney, Agent, or Firm* — Birch, Stewart, Kolasch & Birch, LLP (57) ABSTRACT

A control device for a hybrid vehicle including an internal combustion engine includes: a limiting unit configured to limit an output of the internal combustion engine when temperature of cooling water for cooling the internal combustion engine is equal to or higher than a predetermined temperature; a discharging unit configured to discharge, when internal pressure of a fuel tank is equal to or higher than predetermined pressure, fuel evaporative gas in the fuel tank into an intake passage of the internal combustion engine while the internal combustion engine is being driven; and a prioritizing unit configured to prioritize the limiting of the output of the internal combustion engine by the limiting unit over the discharging of the fuel evaporative gas by the discharging unit, when the discharging unit is to discharge the fuel evaporative gas and the limiting unit is to limit the output of the internal combustion engine.

7 Claims, 6 Drawing Sheets

(51) Int. Cl.
  *B60W 10/06*   (2006.01)
  *B60W 10/08*   (2006.01)
  *B60K 11/02*   (2006.01)
  *B60K 6/46*    (2007.10)
  *B60W 30/184*  (2012.01)
  *B60W 20/10*   (2016.01)
  *B60W 50/00*   (2006.01)
  *B60K 15/03*   (2006.01)

(52) U.S. Cl.
  CPC ........ *Y02T 10/6286* (2013.01); *Y10S 903/905* (2013.01)

CONTROL DEVICE FOR HYBRID VEHICLE

TECHNICAL FIELD

The present disclosure relates to a control device for a hybrid vehicle.

BACKGROUND

Hydrocarbons resulting from evaporation in a fuel tank and an intake manifold are recognized as a cause of photochemical smog. Thus, an increasingly tighter regulation is being imposed on a fuel evaporation rate.

For example, a fuel evaporative emission control device disclosed in Japanese Patent Application Laid-open No. 2013-139751 includes: a connecting passage connecting an intake passage of an internal combustion engine and a fuel tank; a canister for adsorbing fuel evaporative gas incoming through the connecting passage; a connecting passage opening/closing unit switchable between open and closed positions to allow and block flow from the connecting passage to the intake passage; a canister opening/closing unit switchable between open and closed positions to allow and block flow between the canister and the connecting passage; a tank opening/closing unit switchable between open and closed positions to allow and block flow from the fuel tank to the connecting passage; and a tank pressure detection unit for detecting internal pressure of the fuel tank. In the fuel evaporative emission control device, in a state where the internal pressure of the fuel tank is equal to or higher than predetermined pressure and the connecting passage opening/closing unit is put to the closed position, the canister opening/closing unit is put to the closed position, so that the canister is closed, and at the same time, the tank opening/closing unit is put to the open position, so that the fuel tank is opened to the connecting passage. Then, the connecting passage opening/closing unit is put to the open position after passage of a predetermined period of time, so that the connecting passage is connected with the intake passage. In the fuel evaporative emission control device, what is known as purging is executed after the internal pressure becomes the same between the fuel tank and the connecting passage due to the high pressure fuel evaporative gas in the fuel tank flowing into the connecting passage.

SUMMARY

In a hybrid vehicle including an internal combustion engine, when the temperature of cooling water for cooling the engine becomes high, the cooling water needs to be circulated with the internal combustion engine driven in an overheat preventing manner.

Thus, in the fuel evaporative emission control device disclosed in Japanese Patent Application Laid-open No. 2013-139751, when the internal pressure of the fuel tank rises to or above predetermined pressure in a state where the cooling water is circulated with the internal combustion engine driven in the overheat preventing manner, the canister opening/closing unit is put to the closed position to close the canister, and at the same time, the tank opening/closing unit is put to the open position, so that the fuel tank is opened to the connecting passage. Then, the connecting passage opening/closing unit is put to the open position after the passage of the predetermined period of time, so that the connecting passage and the intake passage are connected. This means that in the fuel evaporative emission control device disclosed in Japanese Patent Application Laid-open No. 2013-139751, the purging is executed even when the cooling water is circulated with the internal combustion engine driven in the overheat preventing manner. Thus, when a load on the internal combustion engine is set to be high so that the purging is quickly completed, the internal combustion engine is more likely to be overheated.

In view of the above, an object of at least one embodiment of the present invention is to provide a control device for a hybrid vehicle that can reduce the risk of an internal combustion engine overheating, even when the internal pressure of a fuel tank rises to or above predetermined pressure while the cooling water is circulated with the internal combustion engine driven in an overheat preventing manner.

(1) A control device for a hybrid vehicle including an internal combustion engine according to at least one embodiment of the present invention includes a limiting unit configured to limit an output of the internal combustion engine when temperature of cooling water for cooling the internal combustion engine is equal to or higher than a predetermined temperature, a discharging unit configured to discharge, when internal pressure of a fuel tank is equal to or higher than predetermined pressure, fuel evaporative gas in the fuel tank into an intake passage of the internal combustion engine while the internal combustion engine is being driven, and a prioritizing unit configured to prioritize the limiting of the output of the internal combustion engine by the limiting unit over the discharging of the fuel evaporative gas by the discharging unit, when the discharging unit is to discharge the fuel evaporative gas and the limiting unit is to limit the output of the internal combustion engine.

In the configuration (1) described above, the prioritizing unit is provided that is configured to prioritize the limiting of the output of the internal combustion engine by the limiting unit over the discharging of the fuel evaporative gas by the discharging unit, when the discharging unit is to discharge the fuel evaporative gas and the limiting unit is to limit the output of the internal combustion engine. Thus, when the temperature of the cooling water is equal to or higher than the predetermined temperature and the internal pressure of the fuel tank is equal to or higher than the predetermined pressure, the limiting of the output of the internal combustion engine by the limiting unit is prioritized over the discharging of the fuel evaporative gas by the discharging unit. Thus, the internal combustion engine is less likely to be overheated, even when internal pressure of the fuel tank rises to or above the predetermined pressure while the cooling water is circulated with the internal combustion engine driven in an overheat preventing manner.

(2) According to some embodiments, in the configuration (1) described above, the hybrid vehicle includes a generator driven by the internal combustion engine, the control device further comprising an engine control unit configured to control the internal combustion engine based on a power generation amount of the generator, the limiting unit is configured to determine a first power generation amount employed for limiting the output of the internal combustion engine, the discharging unit is configured to determine a second power generation amount, as an output for driving the internal combustion engine, employed for discharging the fuel evaporative gas in the fuel tank into the intake passage, and the prioritizing unit is configured to instruct to continue, when a request for driving the internal combustion engine with the second power generation amount (discharging power generation amount) from the discharging unit to the engine control unit is issued while the engine control unit driving the internal combustion engine with the first power generation amount (limited power generation amount), the driving of the internal combustion engine based on the first power generation amount (limited power generation amount).

In the configuration (2) described above, when the request for driving the internal combustion engine with the second power generation amount (discharging power generation amount) is issued while the internal combustion engine is being controlled by the first power generation amount (limited power generation amount), the driving of the internal combustion engine based on the first power generation amount (limited power generation amount) continues. Thus, the driving of the internal combustion engine is controlled based on the first power generation amount (limited power generation amount) smaller than the second power generation amount (discharging power generation amount). Thus, the internal combustion engine is less likely to be overheated, even when internal pressure of the fuel tank rises to or above the predetermined pressure while the cooling water is circulated with the internal combustion engine driven in the overheat preventing manner.

(3) According to some embodiments, in the configuration (2) described above, the hybrid vehicle is capable of driving a driving wheel of the hybrid vehicle with power generated by the generator, the hybrid vehicle includes a first calculation unit configured to calculate a third power generation amount (driving power generation amount) required for the driving, and the prioritizing unit is configured to compare the third power generation amount (driving power generation amount), calculated by the first calculation unit, with the second power generation amount (discharging power generation amount), so that a larger one of the third power generation amount and the second power generation amount is employed for driving the internal combustion engine.

In the configuration (3) described above, when the internal pressure of the fuel tank is equal to or higher than the predetermined pressure, the prioritizing unit is configured to compare the third power generation amount (driving power generation amount), calculated by the first calculation unit, with the second power generation amount (discharging power generation amount), so that a larger one of the third power generation amount and the second power generation amount is used for driving the internal combustion engine. Thus, the combustion of the fuel evaporative gas discharged into the intake passage of the internal combustion engine is facilitated. Thus, the internal pressure of the fuel tank can be quickly reduced.

(4) According to some embodiments, in the configuration (3) described above, the hybrid vehicle includes a driving battery configured to store power required for traveling, an air conditioner device configured to adjust an environment in a cabin of the hybrid vehicle, a second calculation unit configured to calculate a fourth power generation amount (charging power generation amount) required for charging the battery, and a third calculation unit configured to calculate a fifth power generation amount (air-conditioning power generation amount) required for the air conditioner device, and the prioritizing unit is configured to compare a total power generation amount of the third to the fifth power generation amounts (a total power generation amount of the driving power generation amount, the charging power generation amount, and the air-conditioning power generation amount) with the first power generation amount (limited power generation amount), and prioritize the first power generation amount (limited power generation amount) when the first power generation amount (limited power generation amount) is smaller.

In the configuration (4) described above, the prioritizing unit is configured to compare the total power generation amount of the third to the fifth power generation amounts (the total power generation amount of the driving power generation amount, the charging power generation amount, and the air-conditioning power generation amount) with the first power generation amount (limited power generation amount), and prioritize the first power generation amount (limited power generation amount) when the first power generation amount (limited power generation amount) is smaller. Thus, the internal combustion engine is controlled by the first power generation amount (limited power generation amount) when the temperature of the cooling water is at or higher than the predetermined temperature. Thus, the engine 21 is controlled based on the limited power generation amount to suppress generation of heat, whereby the temperature of the cooling water can be quickly lowered.

(5) According to some embodiments, in the configuration (3) or (4) described above, the prioritizing unit is configured to compare a total power generation amount of the third to the fifth power generation amounts (the total power generation amount of the driving power generation amount, the charging power generation amount, and the air-conditioning power generation amount) with the second power generation amount (discharging power generation amount), and prioritize the total power generation amount when the total power generation amount is larger than the second power generation amount (discharging power generation amount).

In the configuration (5) described above, when the internal pressure of the fuel tank is equal to or higher than the predetermined pressure, the prioritizing unit is configured to compare the total power generation amount of the third to the fifth power generation amounts (the total power generation amount of the driving power generation amount, the charging power generation amount, and the air-conditioning power generation amount) with the second power generation amount (discharging power generation amount), and prioritize the total power generation amount when the total power generation amount is larger than the second power generation amount (discharging power generation amount). Thus, the combustion of the fuel evaporative gas discharged into the intake passage of the internal combustion engine is facilitated. Thus, the internal pressure of the fuel tank can be quickly reduced.

(6) According to some embodiments, in the configuration (2) or (3) described above, the first power generation amount (limited power generation amount) is determined to be a fixed power generation amount, and the second power generation amount (discharging power generation amount) is determined to be a fixed power generation amount that is larger than the first power generation amount (limited power generation amount).

In the configuration (6) described above, the prioritizing unit causes the internal combustion engine to be driven based on the first power generation amount (fixed value) when the temperature of the cooling water is equal to or higher than the predetermined temperature. The prioritizing unit causes the internal combustion engine to be driven based on the second power generation amount (fixed value) when the temperature of the cooling water is lower than the predetermined temperature and the internal pressure of the fuel tank is equal to or higher than the predetermined pressure. Thus, the control device of the hybrid vehicle can have a simple control-related configuration.

As described above, in at least one embodiment of the present invention, the internal combustion engine is less likely to be overheated, even when internal pressure of the fuel tank rises to or above the predetermined pressure while the cooling water is circulated with the internal combustion engine driven in the overheat preventing manner.

DETAILED DESCRIPTION

Embodiments of the present invention will now be described in detail with reference to the accompanying drawings. It is intended, however, that unless particularly specified, dimensions, materials, shapes, relative positions, and the like of components described in the embodiments shall be interpreted as illustrative only and not limitative of the scope of the present invention.

For example, expressions representing relative or absolute positions, such as "in a direction", "along a direction", "parallel with", "orthogonal to", "center", and "concentric" do not only represent exact positions that are understood from these expressions, but also cover positions which are displaced by tolerances or are relatively displaced to such a degree that the same functions can be achieved.

In addition, expressions representing shapes, such as rectangular or cylindrical shapes do not only mean exactly rectangular or cylindrical shapes in a geometrical sense, but also cover similar shapes including irregularities or chamfered surfaces to such a degree that the same functions can be achieved.

In addition, expressions representing "comprising", "including", "containing", "provided with", and "having" one component are not exclusive expressions that exclude other components.

First of all, a configuration of a hybrid vehicle 1 employing a control device according to one embodiment of the present invention is described with reference to FIGS. 1 and 2. FIG. 1 is a schematic view of the hybrid vehicle 1 employing the control device according to one embodiment of the present invention. FIG. 2 is a diagram illustrating a configuration around an engine and a fuel tank in the hybrid vehicle 1 illustrated in FIG. 1.

As illustrated in FIG. 1, the hybrid vehicle 1 employing the control device according to one embodiment of the present invention includes a power device 2 including an engine (internal combustion engine) 21 and a motor 22. In addition to the engine 21 and the motor 22 (a front motor 22A and a rear motor 22B), the hybrid vehicle 1 includes: a generator (power generator) 23 driven by the engine 21; a driving battery 24 charged by electricity supplied from the generator 23 or a commercial power source; and a travel device 25 (25A and 25B) driven by the engine 21 or the motor 22.

For the hybrid vehicle 1 according to one embodiment, any one of an "EV drive" mode, a "series drive" mode, and a "parallel drive" mode can be selected as appropriate. Thus, the hybrid vehicle 1 according to one embodiment travels in any one of the "EV drive" mode, the "series drive" mode, and the "parallel drive" mode thus selected.

Figure 1A:
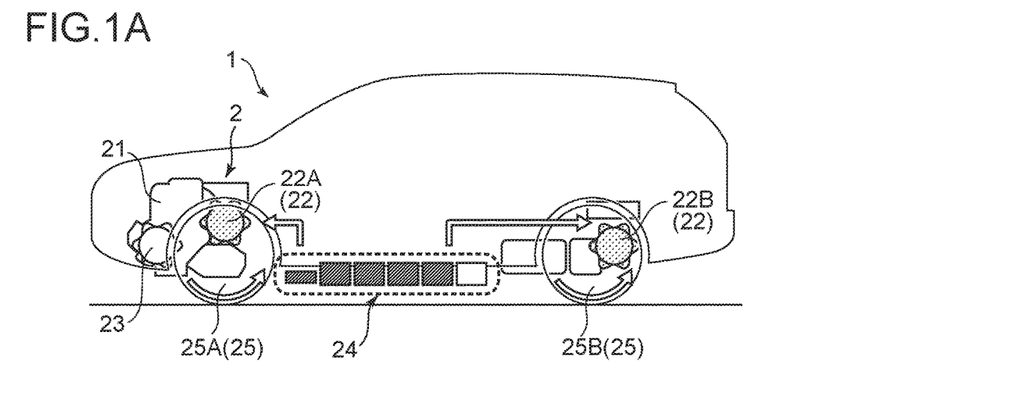
FIG. 1 is a schematic view of a hybrid vehicle employing a control device according to one embodiment of the present invention.
Figure 1B:
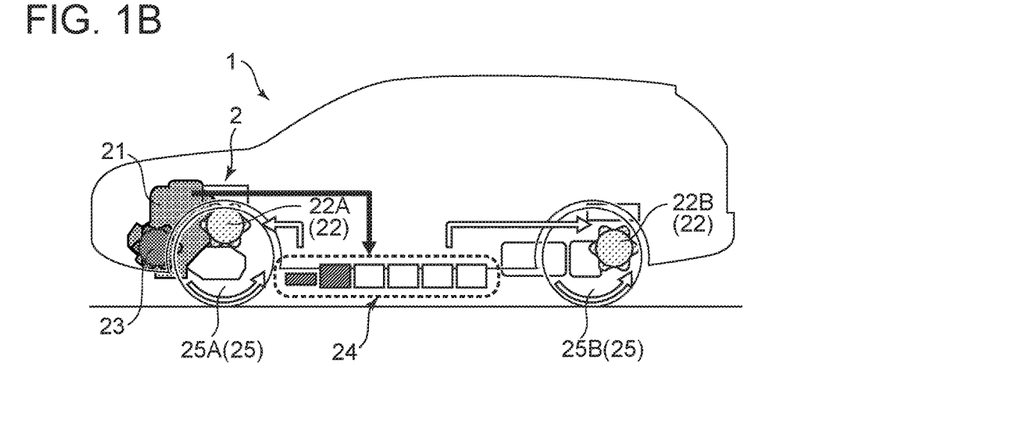
Figure 1C:
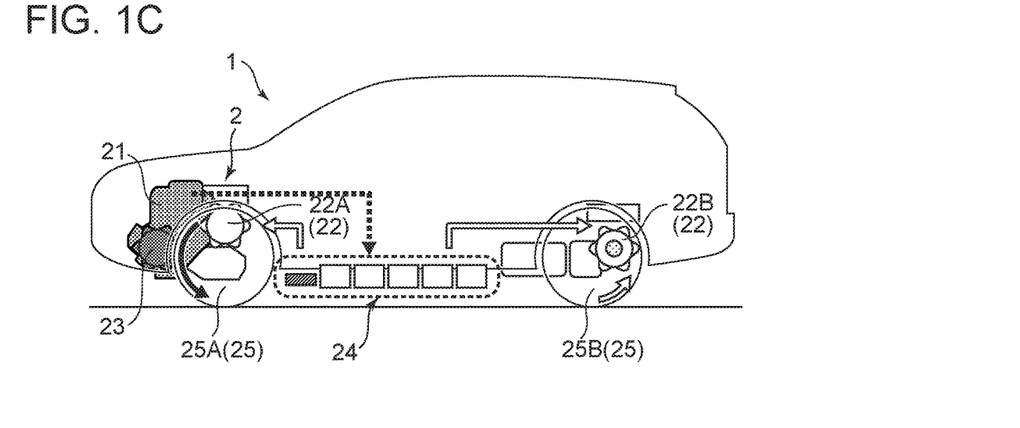
Figure 2:
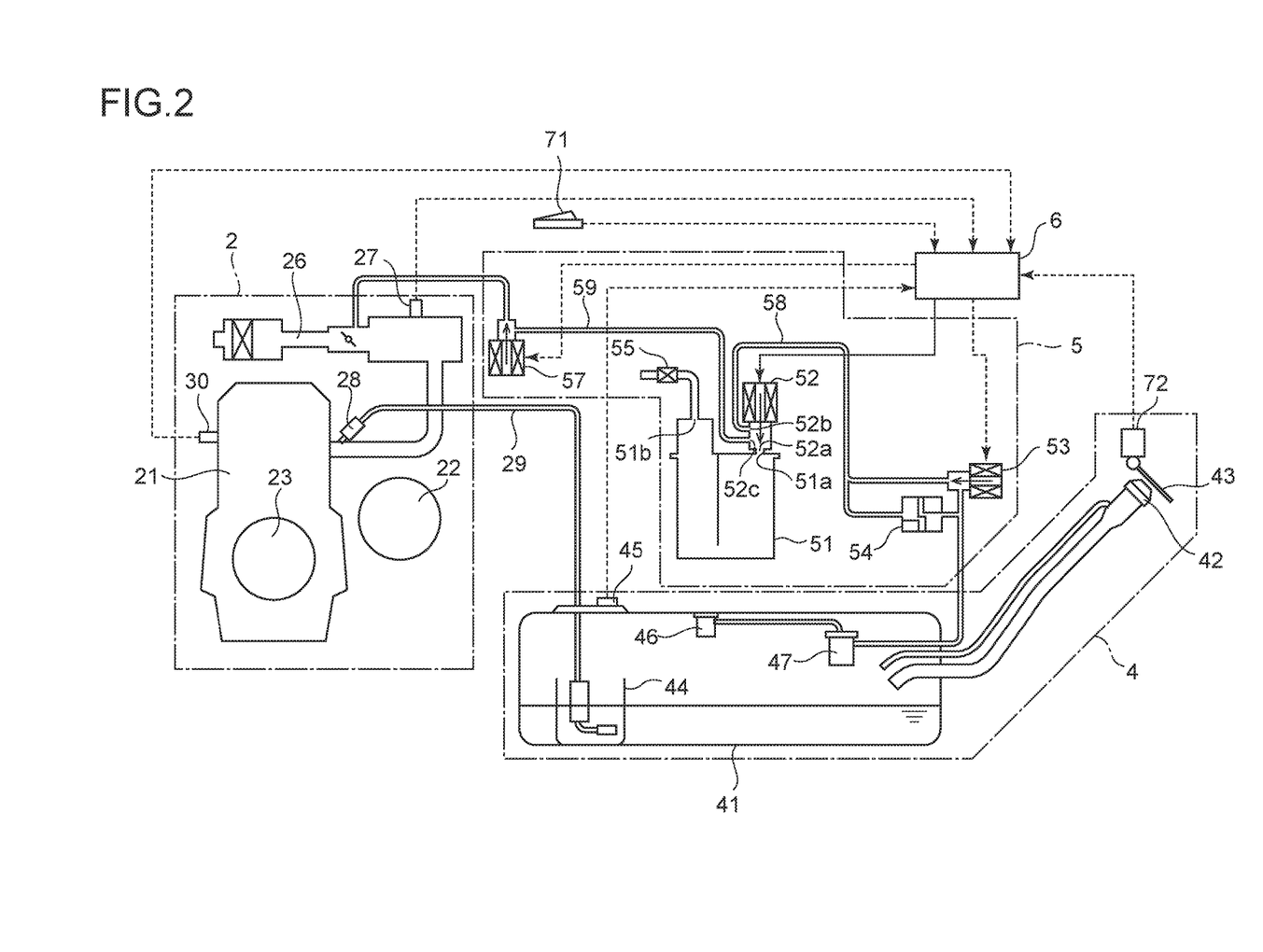
FIG. 2 is a diagram illustrating a configuration around an engine and a fuel tank in the hybrid vehicle illustrated in FIG. 1.

As illustrated in FIG. 1A, in the "EV drive" mode, the travel device 25 (25A, 25B) is driven with electricity supplied to the motor 22 (22A, 22B) from the driving battery 24. In this mode, the motor 22 (22A, 22B) is driven but the engine 21 is stopped. As illustrated in FIG. 1B, in the "series drive" mode, the travel device 25 (25A, 25B) is driven with electricity supplied to the driving battery 24 from the generator 23 driven by the engine 21 and electricity supplied to the motor 22 (22A, 22B) from the driving battery 24. In this mode, the engine 21 and the motor 22 (22A, 22B) are driven. As illustrated in FIG. 1C, in the "parallel drive" mode, the travel device 25 (25A, 25B) is driven by the engine 21 and the motor 22 (22A, 22B), with excess electricity supplied to the driving battery 24 from the generator 23 driven by the engine 21. In this mode, the engine 21 and the motor 22 (22A, 22B) are driven, as in the "series drive" mode.

As illustrated in FIG. 2, the hybrid vehicle 1 according to one embodiment includes: the power device 2 installed in the vehicle; a fuel storage unit 4 that stores fuel; a fuel evaporative gas processing unit 5 that processes evaporative gas (hereinafter, referred to as "fuel evaporative gas") as a result of evaporation of the fuel in the fuel storage unit 4; an electronic control unit (hereinafter, referred to as an ECU) 6 that includes an input/output device, a storage device (such as a read only memory (ROM), a random access memory (RAM), and a nonvolatile RAM), a central processing unit (CPU), and the like and performs overall control on the vehicle; a fuel filler lid opening/closing switch 71 that is operated for opening/closing a fuel filler lid 43 of the vehicle; and a fuel filler lid sensor 72 that detects opening/closing of the fuel filler lid 43.

The power device 2 includes the engine 21, the motor 22, and the generator 23 described above.

The engine 21 is a multi-point injection (MPI) four-cycle inline four-cylinder petrol engine. The engine 21 has an intake passage 26 through which air is drawn into combustion chambers of the engine 21. The intake passage 26 is provided with an intake pressure sensor 27 that detects internal pressure of the intake passage 26. A fuel injection valve 28 through which fuel is injected into an intake port of the engine 21 is provided to a downstream portion of the intake passage 26. The fuel injection valve 28 is connected to a fuel pipe 29 through which the fuel is supplied. The engine 21 is further provided with an unillustrated water jacket in which cooling water, for cooling the engine 21, circulates. The water jacket is provided with a temperature sensor 30 that detects the temperature of the cooling water in the water jacket.

The fuel storage unit 4 includes: a fuel tank 41 where the fuel is stored; a fuel filler 42 serving as a fuel inlet of the fuel tank 41; the fuel filler lid 43 that is disposed on a vehicle body and serves as a lid for the fuel filler 42; a fuel pump 44 that supplies the fuel from the fuel tank 41 to the fuel injection valve 28 through the fuel pipe 29; a pressure sensor (tank pressure detection unit) 45 that detects pressure in the fuel tank 41; a fuel cutoff valve 46 that incorporates an unillustrated float valve with which the fuel is prevented from leaking from the fuel tank 41 to the fuel evaporative gas processing unit 5; and a leveling valve 47 that controls a liquid surface in the fuel tank 41 when the fuel is supplied.

The fuel evaporative gas generated in the fuel tank 41 is discharged outside the fuel tank 41 through the fuel cutoff valve 46 and the leveling valve 47.

The fuel evaporative gas processing unit 5 includes a canister 51, a vapor solenoid valve (canister opening/closing unit) 52, a tank shutoff valve (tank opening/closing unit) 53, a safety valve 54, an air filter 55, a purge solenoid valve (connecting passage opening/closing unit) 57, a vapor pipe (connecting passage) 58, and a purge pipe (connecting passage) 59.

The canister 51 holds activated carbon inside. The canister 51 has a vapor port 51a through which the fuel evaporative gas generated in the fuel tank 41 can flow in and fuel evaporative gas that has adsorbed on and then released from the activated carbon can flow out. The canister 51 also has an ambient air inlet 51b to draw in ambient air to cause fuel evaporative gas to be released from the activated carbon and emitted from the canister 51. The ambient air inlet 51b is connected to one side of the air filter 55 having the other side, which is contaminants-entry prevention side, open to the atmosphere.

The vapor solenoid valve 52 has a canister-connection port 52a connected to the evaporative gas flow port 51a of the canister 51. The vapor solenoid valve 52 further has a vapor pipe-connection port 52b and a purge pipe-connection port 52c. The vapor pipe-connection port 52b is connected to one end of the vapor pipe 58 having the other end connected to the leveling valve 47 of the fuel tank 41. The purge pipe-connection port 52c is connected to one end of the purge pipe 59 having the other end connected to the intake passage 26 of the engine 2L The vapor pipe-connection port 52b and the purge pipe-connection port 52c of the vapor solenoid valve 52 are respectively connected to the vapor pipe 58 and the purge pipe 59. The vapor solenoid valve 52 is a normally-closed solenoid valve that is closed in a non-energized state, and is open when an energized state is established with a driving signal externally supplied. When the vapor solenoid valve 52 is in the energized state due to the externally supplied driving signal, and thus is open, the canister connection port 52a, the vapor pipe-connection port 52b, and the purge pipe-connection port 52c are in communication with each other. Thus, the fuel evaporative gas can flow into and out of the canister 51, and the ambient air, drawn in through the air filter 55, can flow into the vapor pipe 58 and the purge pipe 59. When the vapor solenoid valve 52 is in the non-energized state and thus is closed, the canister connection port 52a is closed, and only the vapor pipe-connection port 52b and the purge pipe-connection port 52c are open. Thus, the fuel evaporative gas cannot flow into and out of the canister 51, and the ambient air cannot flow into the vapor pipe 58 and the purge pipe 59 through the air filter 55. Thus, the vapor solenoid valve 52 closes the canister 51 while being closed and opens the canister 51 while being open.

The tank shutoff valve 53 is disposed at an intermediate position of the vapor pipe 58. The tank shutoff valve 53 is a normally-closed solenoid valve that is closed in a non-energized state, and is open when an energized state is established with a driving signal externally supplied. When the tank shutoff valve 53 is in the non-energized state and thus is closed, the vapor pipe 58 is closed. When the tank shutoff valve 53 is in the energized state, established with the externally supplied driving signal, the vapor pipe 58 is open. Thus, when the tank shutoff valve 53 is closed, the fuel tank 41 is closed and sealed, so that no fuel evaporative gas, generated in the fuel tank 41, can flow out of the fuel tank 41. The fuel evaporative gas can flow out to the canister 51 when the tank shutoff valve 53 is open.

The safety valve 54 is disposed at an intermediate portion of the vapor pipe 58 to be in parallel with the tank shutoff valve 53. The safety valve 54 opens when the pressure in the fuel tank 41 rises, so that the pressure escapes to the canister 51. Thus, the fuel tank 41 is prevented from rupturing.

The purge solenoid valve 57 is disposed at an intermediate position of the purge pipe 59 between the intake passage 26 of the engine 21 and the vapor solenoid valve 52. The purge solenoid valve 57 is a normally-closed solenoid valve that is closed in a non-energized state, and is open when an energized state is established with a driving signal externally supplied. When the purge solenoid valve 57 is in the non-energized state and thus is closed, the purge pipe 59 is closed. When the purge solenoid valve 57 is in the energized state, established with the externally supplied driving signal, and thus is open, the purge pipe 59 is open. Thus, when the purge solenoid valve 57 is closed, the fuel evaporative gas cannot flow into the engine 21 from the fuel evaporative gas processing unit 5. The fuel evaporative gas can flow into the engine 21 when the purge solenoid valve 57 is open.

Figure 3:
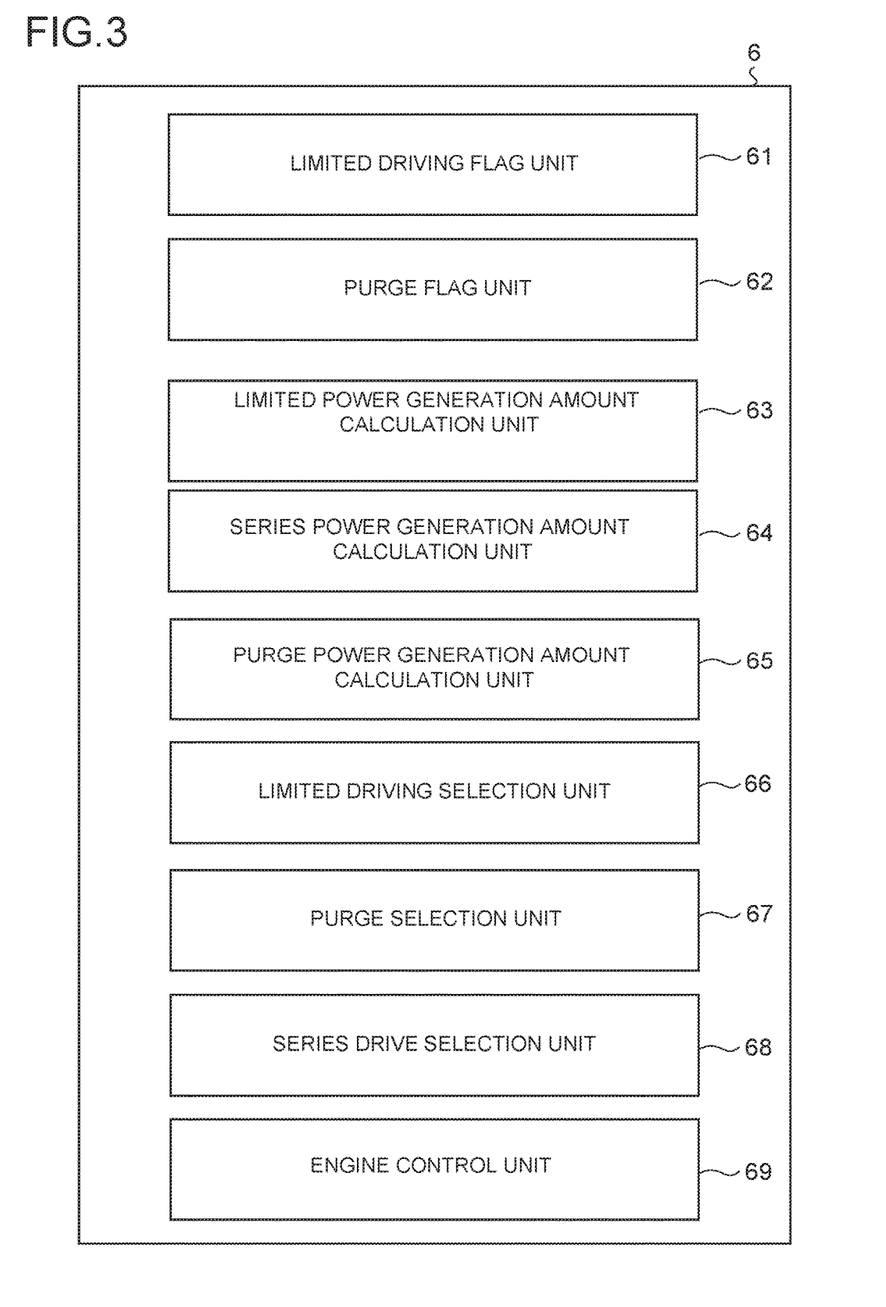
FIG. 3 is a block diagram illustrating a control-related configuration of an electronic control unit (ECU) illustrated in FIG. 2.

Next, a configuration of the ECU 6 is described with reference to FIG. 3. FIG. 3 is a block diagram illustrating a control-related configuration of the ECU 6 illustrated in FIG. 2.

As described above, the ECU 6 is a control device that performs the overall control on the vehicle, and includes the input/output device, the storage device (such as a ROM, a RAM, and a non-volatile RAM), the CPU, a timer, and the like.

The ECU 6 has an input side connected to the intake pressure sensor 27, the temperature sensor 30, the pressure sensor 45, the fuel filler lid opening/closing switch 71 in charge of opening/closing the fuel filler lid 43 on the vehicle, and the fuel filler lid sensor 72 that detects the opening/closing of the fuel filler 42. Thus, the ECU 6 receives detection information from these sensors.

The ECU 6 has an output side connected to the fuel injection valve 28, the fuel pump 44, the vapor solenoid valve 52, the tank shutoff valve 53, and the purge solenoid valve 57.

The ECU 6 performs various types of control based on the detection information from the sensors. Such control includes: control on opening/closing of the vapor solenoid valve 52, the tank shutoff valve 53, and the purge solenoid valve 57; control on pressure in the fuel tank 41 and in the vapor pipe 58 and the purge pipe 59 between the tank shutoff valve 53 and the purge solenoid valve 57; and control on a flow of the fuel evaporative gas including a flow of the fuel evaporative gas to be adsorbed in the canister 51, a flow of the fuel evaporative gas into the intake passage 26 of the engine 21 after the adsorbing in the canister 51, and the like.

The ECU 6 includes: a limiting unit that limits an output of the engine 21 when the temperature of the cooling water for cooling the engine 21 is equal to or higher than predetermined temperature; a discharging unit that discharges the fuel evaporative gas in the fuel tank 41 into the intake passage 26 of the engine 21 in the driving state, when the internal pressure of the fuel tank 41 is equal to or higher than predetermined pressure; and a prioritizing unit that prioritizes the limiting of the output of the engine by the limiting unit over the discharging of the fuel evaporative gas by the discharging unit.

More specifically, as illustrated in FIG. 3, the ECU 6 includes: a limited driving flag unit 61, a purge flag unit 62, a limited power generation amount calculation unit 63, a series power generation amount calculation unit 64, a purge power generation amount calculation unit 65, a limited driving selection unit 66, a purge selection unit 67, and a series drive selection unit 68.

The ECU 6 also comprises an engine control unit 69 configured to control the engine 21 based on a power generation amount of the generator 23 driven by the engine 21.

The limited driving flag unit (the limiting unit) 61 turns ON a limited driving flag when the temperature of the cooling water, detected by the temperature sensor 30, is equal to or higher than predetermined temperature (hereinafter, referred to as "first temperature"), and turns OFF the limited driving flag when the temperature of the cooling water, detected by the temperature sensor 30, is lower than the predetermined temperature (hereinafter, referred to as "second temperature"). Thus, the limited driving flag, which is normally OFF, is turned ON by the limited driving flag unit 61 when the temperature of the cooling water, detected by the temperature sensor 30, rises to or above the first temperature, and is turned OFF by the limited driving flag unit 61 when the temperature of the cooling water, detected by the temperature sensor 30, drops below the second temperature. The first temperature serves as an index for preventing the engine 21 from overheating, and the second temperature is set to be lower than the first temperature.

The purge flag unit (the discharging unit) 62 turns ON a purge flag when the internal pressure of the fuel tank 41, detected by the pressure sensor 45, is equal to or higher than predetermined pressure (hereinafter, referred to as "first pressure") and turns OFF the purge flag when the internal pressure of the fuel tank 41, detected by the pressure sensor 45, is lower than predetermined pressure (hereinafter, referred to as "second pressure"). Thus, the purge flag, which is normally OFF, is turned ON by the purge flag unit 62 when the internal pressure of the fuel tank 41, detected by the pressure sensor 45, rises to or above the first pressure, and is turned OFF by the purge flag unit 62 when the purging ends and the internal pressure of the fuel tank 41, detected by the pressure sensor 45 drops below the second pressure. The first pressure serves as an index for preventing excessive pressure rise in the fuel tank 41, and the second pressure is set to be lower than the first pressure.

The limited power generation amount calculation unit (the limiting unit) 63 calculates a power generation amount (first power generation amount), used as the limited power generation amount, for regulating the temperature rise of the cooling water. The power generation amount (the first power generation amount) for regulating the temperature rise of the cooling water is a power generation amount that causes no further rise in the temperature of the cooling water, when used as the index for controlling the engine 21. An example of the power generation amount includes a power generation amount with which the temperature of the cooling water does not rise to or above the first temperature.

The limited power generation amount may be a fixed value set in advance as appropriate, or a value that can be changed without exceeding an upper limit value set as appropriate. The value may change in accordance with the driving state of the hybrid vehicle or the like.

For example, the limited power generation amount calculation unit 63 may include: a calculation unit (first calculation unit) that calculates an amount of electricity (third power generation amount) used for driving the motor 22; a calculation unit (second calculation unit) that calculates an amount of electricity (fourth power generation amount) used for charging the driving battery 24; and a calculation unit (third calculation unit) that calculates an amount of electricity (fifth power generation amount) supplied to an air conditioner device for adjusting an environment in a cabin of the vehicle. In this configuration, the first power generation amount may be prioritized to be the limited power generation amount when the first power generation amount is smaller than a total power generation amount of the third to the fifth power generation amounts.

The series power generation amount calculation unit 64 calculates an amount of electricity required for the series drive of the hybrid vehicle 1. The amount of electricity thus calculated is used as the series power generation amount. Examples of the amount of electricity required for the series drive of the hybrid vehicle 1 include: an amount of electricity used for driving the motor 22; an amount of electricity used for charging the driving battery 24; and an amount of electricity used for driving the air conditioner device and other auxiliaries. When the driving battery 24 is not changed while the hybrid vehicle 1 is traveling, the amount of electricity used for charging the driving battery 24 is zero.

The purge power generation amount calculation unit (the discharging unit) 65 calculates an amount of electricity (the second power generation amount) required for discharging (hereinafter, referred to as "purging") the fuel evaporative gas into the intake passage. The amount of electricity thus calculated is used as a discharging power generation amount. For example, a larger one of a purge predetermined power generation amount set in advance and the amount of electricity required for the series drive is used as the amount of electricity required for the purging, that is, the discharging power generation amount.

For example, the purge power generation amount calculation unit 65 may include: the calculation unit (first calculation unit) that calculates the amount of electricity (third power generation amount) used for driving the motor 22; the calculation unit (second calculation unit) that calculates the amount of electricity (fourth power generation amount) used for charging the driving battery 24; and the calculation unit (third calculation unit) that calculates the amount of electricity (fifth power generation amount) supplied to the air conditioner device for adjusting an environment in the cabin of the vehicle. In this configuration, the total power generation amount of the third to the fifth power generation amounts may be prioritized to be the discharging power generation amount when the second power generation amount is smaller than the total power generation amount of the third to the fifth power generation amounts.

The limited driving selection unit (the prioritizing unit) 66 selects the limited power generation amount, calculated by the limited power generation amount calculation unit 63, as the index for controlling the engine 21, when the limited driving flag is ON. Thus, the limited power generation amount, calculated by the limited power generation amount calculation unit 63, is prioritized over the discharging power generation amount, calculated by the purge power generation amount calculation unit 65, to be the index for controlling the engine 21, when the limited driving flag is ON and the purge flag is OFF, and also when the limited driving flag is ON and the purge flag is ON.

Thus, the prioritizing unit is configured to instruct to continue, when a request for driving the engine 21 with the second power generation amount from the discharging unit to the engine control unit 69 is issued while the engine control unit 69 driving the engine 21 with the first power generation amount. As the result, the engine 21 is less likely to be overheated, even when internal pressure of the fuel tank 41 rises to or above the predetermined pressure while the cooling water is circulated with the engine 21 driven in an overheat preventing manner.

The purge selection unit (the discharging unit) 67 selects the purge power generation amount, calculated by the purge power generation amount calculation unit 65, as the index for controlling the engine 21, when the limited driving flag is OFF and the purge flag is ON.

The series drive selection unit 68 selects the series power generation amount, calculated by the series power generation amount calculation unit 64, as the index for controlling the engine 21, when the limited driving flag is OFF and the purge flag is OFF.

Figure 4:
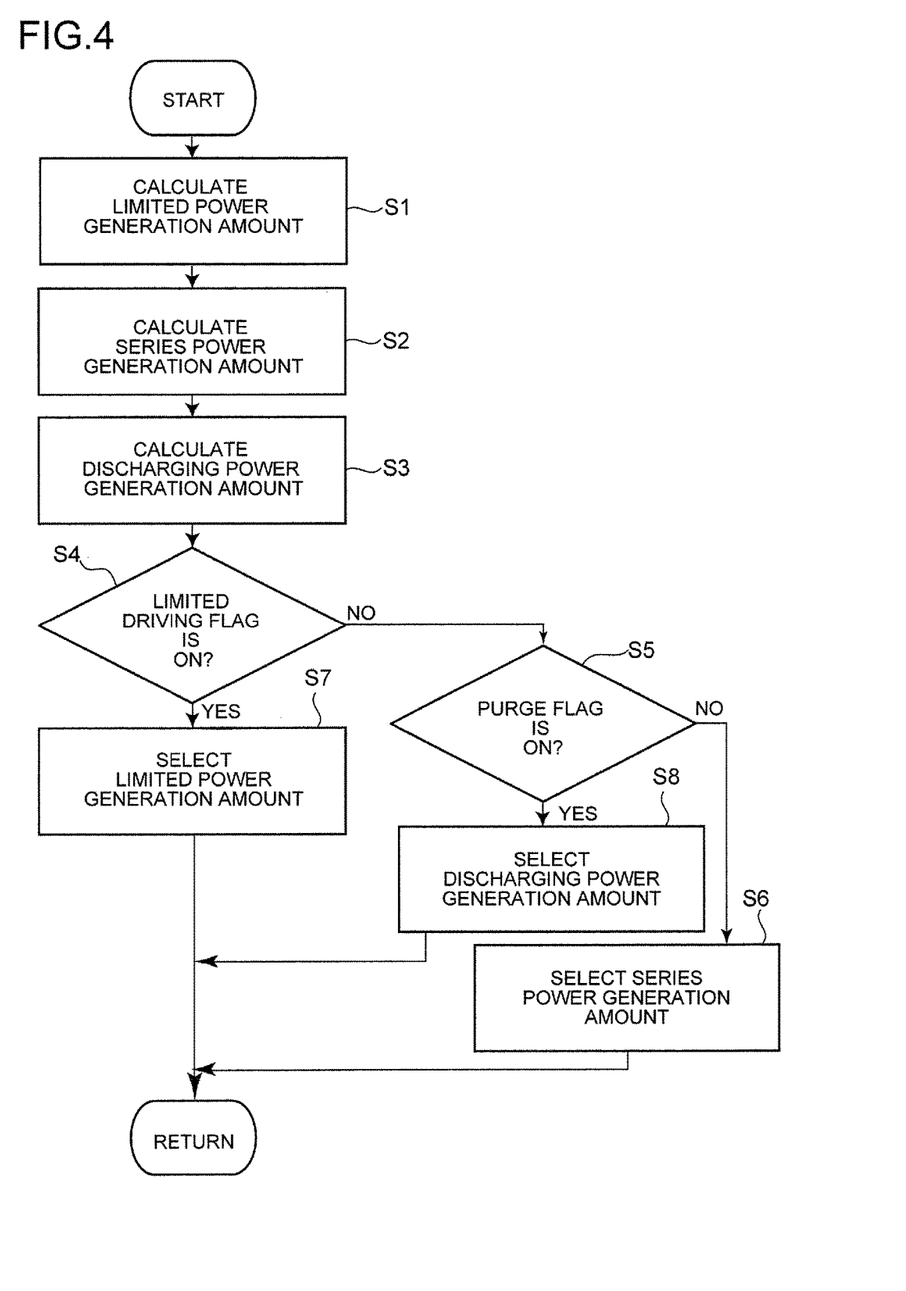
FIG. 4 is a flowchart illustrating control performed by the ECU illustrated in FIG. 3.

Next, control performed by the ECU 6 while the hybrid vehicle 1 is in the series drive mode will be described with reference to FIG. 4. FIG. 4 is a flowchart illustrating the control performed by the ECU 6 illustrated in FIG. 3.

In the hybrid vehicle 1, the temperature sensor 30 detects the temperature of the cooling water for cooling the engine 21, and the pressure sensor 45 detects the internal pressure of the fuel tank 41.

In the ECU 6, the limited driving flag unit 61 turns the limited driving flag (limited driving request) ON from OFF when the temperature of the cooling water, detected by the temperature sensor 30, rises to or above the first temperature, and turns the limited driving flag OFF from ON when the temperature of the cooling water, detected by the temperature sensor 30, drops below the second temperature.

In the ECU 6, the purge flag unit 62 turns the purge flag (purge request) ON from OFF when the internal pressure of the fuel tank 41, detected by the pressure sensor 45, rises to or above the first pressure, and turns the purge flag OFF from ON when the internal pressure of the fuel tank 41, detected by the pressure sensor 45, drops below the second pressure.

When the series drive mode is selected in the hybrid vehicle 1, in the ECU 6, the limited power generation amount calculation unit 63 calculates the limited power generation amount (step S1), the series power generation amount calculation unit 64 calculates the series power generation amount (step S2), and the purge power generation amount calculation unit 65 calculates the discharging power generation amount (step S3) as illustrated in FIG. 4.

When the limited driving flag is OFF (step S4: No) and the purge flag is OFF (step S5: No) in the series drive mode, in the ECU 6, the series drive selection unit 68 selects the series power generation amount, calculated by the series power generation amount calculation unit 64, as the index for controlling the engine 21 (step S6). Thus, the engine 21 is driven based on the series power generation amount calculated by the series power generation amount calculation unit 64.

When the temperature of the cooling water, detected by the temperature sensor 30, rises to or above the first temperature, in the ECU 6, the limited driving flag unit 61 turns the limited driving flag ON from OFF (step S4: Yes). Then, the ECU 6 prohibits the transition from the series drive mode to the EV drive mode, and the limited driving selection unit 66 selects the limited power generation amount, calculated by the limited power generation amount calculation unit 63, as the index for controlling the engine 21 (step S7). Thus, the engine 21 is controlled based on the limited power generation amount, whereby the temperature rise of the cooling water is regulated.

When the internal pressure of the fuel tank 41, detected by the pressure sensor 45, rises to or above the first pressure while the limited driving flag is ON, in the ECU 6, the purge flag unit 62 turns the purge flag On from OFF. Still, when the limited driving flag is ON (step S4: Yes) and the purge flag is ON, the limited driving selection unit 66 prioritizes the limited power generation amount, calculated by the limited power generation amount calculation unit 63, over the discharging power generation amount, calculated by the purge power generation amount calculation unit 65. Thus, the state with the limited power generation amount selected as the index for controlling the engine 21 is maintained. Thus, in the hybrid vehicle 1, the engine 21 is controlled based on the limited power generation amount, so that the temperature rise of the cooling water is regulated, even when the internal pressure of the fuel tank 41 rises to or above the first pressure.

When the limited driving flag is ON and the purge flag is OFF at the point of step S4, the processing proceeds to step S7 so that the state with the limited power generation amount selected as the index for controlling the engine 21 is maintained, as in the case where the purge flag is ON. Thus, the processing proceeds to step S7 from S4 regardless of whether the purge flag is ON or OFF.

When the temperature of the cooling water, detected by the temperature sensor 30, drops below the second temperature, in the ECU 6, the limited driving flag unit 61 turns the limited driving flag OFF from ON (step S4: No). Thus, in the ECU 6, the limited driving flag is OFF (step S4: No) and the purge flag is ON (step S5: Yes). Accordingly, the purge selection unit 67 selects the discharging power generation amount, calculated by the purge power generation amount calculation unit 65, as the index for controlling the engine 21 (step S8). Thus, the engine 21 is controlled based on the discharging power generation amount, calculated by the purge power generation amount calculation unit 65. In the present embodiment, a larger one of the series power generation amount, calculated by the series power generation amount calculation unit, and the purge predetermined power generation amount set in advance, is used as the discharging power generation amount.

In the ECU 6, the purge flag is turned ON from OFF, when the pressure in the fuel tank, detected by the pressure sensor 45, rises to or above the first pressure while the limited driving flag is OFF and the purge flag is OFF. Thus, also in this case, in the ECU 6, the limited driving flag is OFF (step S4: No) and purge flag is ON (step S5: Yes). Thus, the purge selection unit 67 selects the discharging power generation amount, calculated by the purge power generation amount calculation unit 65, as the index for controlling the engine (step S8).

In the ECU 6, the purging starts when the limited driving flag turns OFF and the purge flag turns ON. When the speed of the engine 21 reaches predetermined speed, the tank shutoff valve 53 is opened and the vapor solenoid valve 52 is closed, and at the same time, a high pressure start timer is operated, so that a count up starts. When time counted by the start timer reaches the end of second predetermined time, the purge solenoid valve 57 is opened. The second predetermined time is obtained in advance through tests and the like and is a period required for the internal pressure of the fuel tank 41 and the internal pressure of the vapor pipe 58 and the purge pipe 59 between the tank shutoff valve 53 and the purge solenoid valve 57 to be the same. Then, when the internal pressure of the fuel tank 41 drops to or below the second pressure, a check timer is turned ON, so that a countdown starts from first predetermined time. When the check timer counts zero, the tank shutoff valve 53 is closed, and a purge end point cumulated amount, representing a cumulated purge flow volume after the tank shutoff valve 53 has closed, is started to be calculated. Then, when the purge end point cumulated amount reaches or exceeds a second predetermined cumulated amount, the vapor solenoid valve 52 is opened. The second predetermined cumulated amount indicates a point where the internal pressure of the vapor pipe 58 and the purge pipe 59, between the tank shutoff valve 53 and the purge solenoid valve 57, becomes equal to the atmospheric pressure (1 atmospheric pressure). When the purge end point cumulated amount reaches or exceeds a first predetermined cumulated amount, the purge solenoid valve 57 is closed and the purging is terminated. The first predetermined cumulated amount is obtained by adding the volumes in the vapor pipe 58 and the purge pipe 59, in a portion extending at least to the purge solenoid valve 57, to the second predetermined cumulated amount.

When the purging ends and the internal pressure of the fuel tank 41, detected by the pressure sensor 45, drops below the second pressure, the purge flag unit 62 turns the purge flag OFF from ON (step S5: No). Then, the ECU 6 permits the transition from the series drive mode to the EV drive mode, and the series drive selection unit 68 selects the series power generation amount, calculated by the series power generation amount calculation unit 64, as the index for controlling the engine 21 (step S6). Thus, the engine 21 is driven based on the series power generation amount, calculated by the series power generation amount calculation unit 64.

Figure 5:
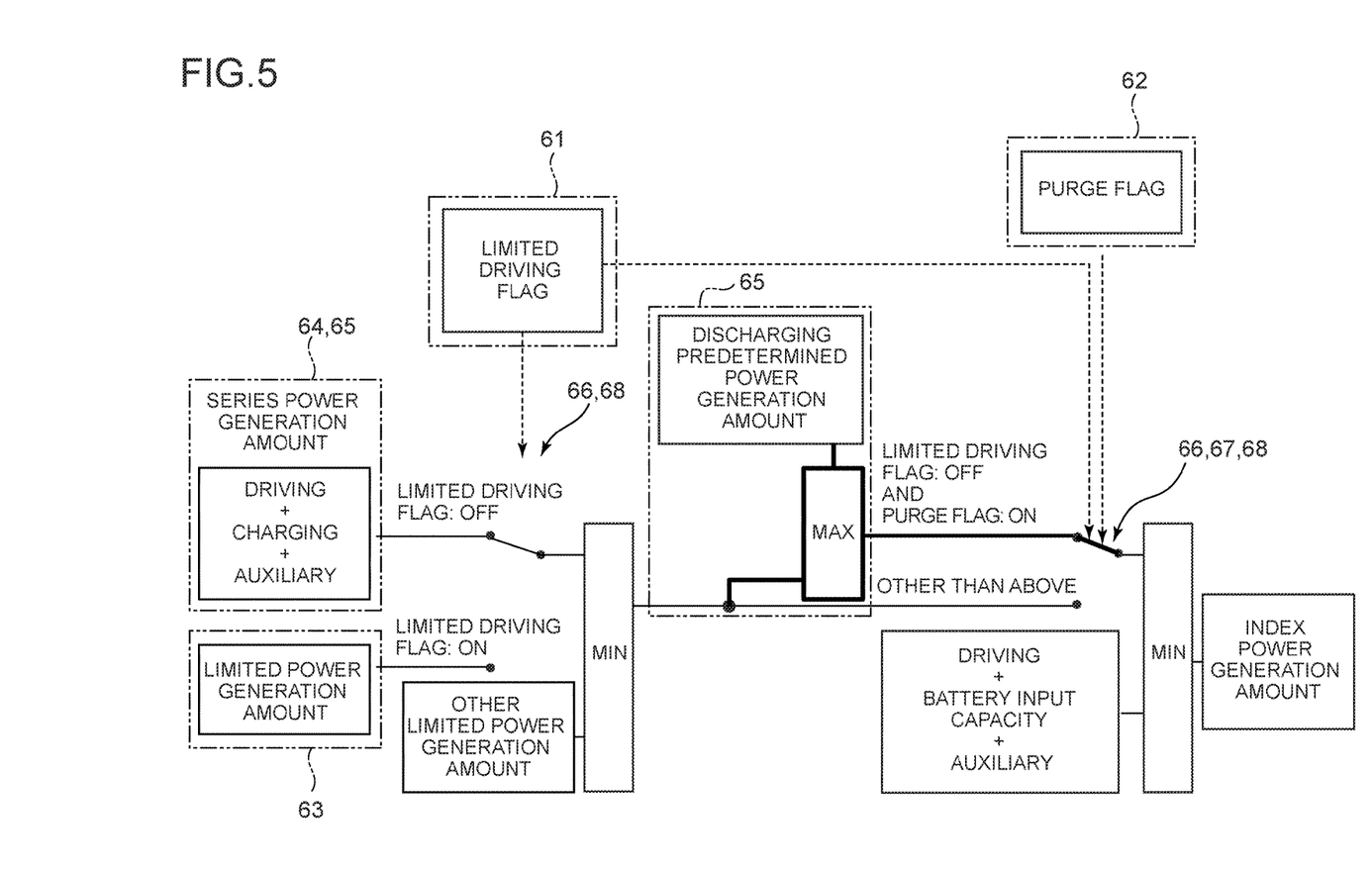
FIG. 5 is a diagram illustrating the control performed by the ECU illustrated in FIG. 4 in detail.
Figure 6:
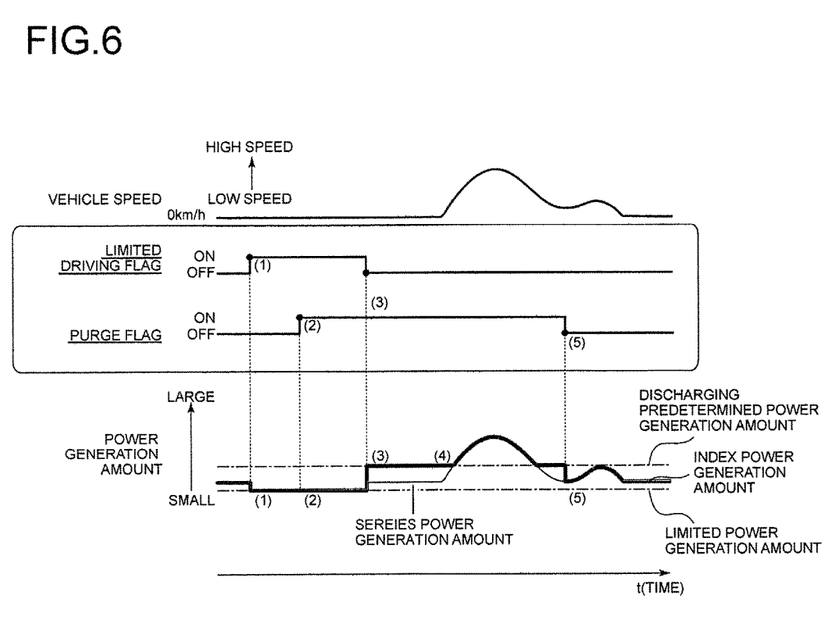
FIG. 6 is a timing chart illustrating the control performed by the ECU illustrated in FIG. 5 in a chronological order.

Next, the control performed by the ECU 6 while the hybrid vehicle 1 is in the series drive mode will be described more in detail with reference to FIGS. 5 and 6. FIG. 5 is a diagram illustrating the control performed by the ECU 6, illustrated in FIG. 4, more in detail. FIG. 6 is a timing chart illustrating the control performed by the ECU 6, illustrated in FIG. 5, in a chronological order.

As illustrated in FIG. 5, when the limited driving flag is OFF and the purge flag is OFF while the hybrid vehicle 1 is in the series drive mode, the series drive selection unit 68 selects the series power generation amount, calculated by the series power generation amount calculation unit 64, as the index for the control. Thus, the series power generation amount is used as the index power generation amount, whereby the engine 21 is driven and controlled based on the series power generation amount.

When the temperature of the cooling water, detected by the temperature sensor 30, rises to or above the first temperature in this state, the limited driving flag unit 61 turns the limited driving flag ON from OFF (FIG. 6 (1)). Thus, the transition of the hybrid vehicle 1 from the series drive mode to the EV drive mode is prohibited, and the limited driving selection unit 66 selects the limited power generation amount, calculated by the limited power generation amount calculation unit 63, as the index for controlling the engine 21. Thus, the limited power generation amount is used as the index power generation amount, whereby the engine 21 is controlled based on the limited power generation amount as illustrated in FIG. 6.

When the internal pressure of the fuel tank 41, detected by the pressure sensor 45, rises to or above the first pressure in this state, the purge flag unit 62 turns the purge flag ON from OFF (FIG. 6 (2)). When the limited driving flag is ON and the purge flag is ON, then as illustrated in FIG. 5, the limited driving selection unit 66 prioritizes the limited power generation amount, calculated by the limited power generation amount calculation unit 63, over the discharging power generation amount, calculated by the purge power generation amount calculation unit, whereby the state with the limited power generation amount selected as the index for controlling the engine 21 is maintained. Thus, the limited power generation amount is used as the power generation amount, and the engine 21 is driven based on the limited power generation amount as illustrated in FIG. 6.

When the temperature of the cooling water, detected by the temperature sensor 30, drops below the second temperature in this state, the limited driving flag unit 61 turns the limited driving flag OFF from ON (FIG. 6 (3)). Thus, the limited driving flag is OFF and the purge flag is ON. As a result, in the ECU 6, the purge selection unit 67 selects the discharging power generation amount, calculated by the purge power generation amount calculation unit 65, as the index for controlling the engine 21. Thus, the discharging power generation amount is used as the index power generation amount, whereby the engine 21 is driven based on the discharging power generation amount.

The purge power generation amount calculation unit 65 selects as the discharging power generation amount, a larger one of the purge predetermined power generation amount set in advance and the amount of electricity (series power generation amount) required for the series drive. Thus, as illustrated in FIG. 6 (4), the discharging power generation amount increases in accordance with the travelling of the hybrid vehicle 1.

When the internal pressure of the fuel tank 41, detected by the pressure sensor 45, drops below the second pressure in this state, the purge flag unit 62 turns the purge flag OFF from ON (FIG. 6 (5)). Thus, the limited driving flag is OFF and the purge flag is OFF. As a result, in the ECU 6, the series drive selection unit 68 selects the series power generation amount, calculated by the series power generation amount calculation unit 64, as the index for the control. Thus, the series power generation amount is used as the index power generation amount, whereby the engine 21 is driven based on the series power generation amount.

As illustrated in FIG. 5, the series power generation amount and the limited power generation amount are limited to be equal to or lower than the other limited power generation amounts. The series power generation amount, the limited power generation amount, and the discharging power generation amount are limited to be equal to or smaller than the sum of the amount of electricity used for driving the motor 22, the battery input capacity (such as state of charge (SOC) for example), and the amount of electricity used for driving the auxiliaries. The maximum power generation amount of the generator 23 driven by the engine 21 and the like are set as the other limited power generation amounts.

The ECU 6, in the hybrid vehicle 1 according to one embodiment described above, includes the prioritizing unit that prioritizes the limiting of the output from the engine 21 by the limiting unit over the discharging of the fuel evaporative gas by the discharging unit. Thus, when the temperature of the cooling water is equal to or higher than the predetermined temperature and the internal pressure of the fuel tank 41 is equal to or higher than the predetermined pressure, the limiting of the output from the engine 21 by the limiting unit is prioritized over the discharging of the fuel evaporative gas by the discharging unit. All things considered, the engine 21 is less likely to be overheated, even when internal pressure of the fuel tank 41 rises to or above the predetermined pressure while the cooling water is circulated with the engine 21 driven in an overheat preventing manner.

More specifically, when the temperature of the cooling water is equal to or higher than the first temperature and the internal pressure of the fuel tank 41 is equal to or higher than the first pressure, the limited power generation amount is prioritized over the discharging power generation amount to be the index for controlling the engine 21. All things considered, the engine 21 is less likely to be overheated, even when internal pressure of the fuel tank 41 rises to or above the first pressure while the cooling water is circulated with the engine 21 driven in the overheat preventing manner.

In the ECU 6 of the hybrid vehicle 1 according to one embodiment, when a request for driving the engine 21 with the discharging power generation amount is issued while the engine 21 is being controlled based on the limited power generation amount, the engine 21 continues to be driven in the limited power generation amount. Thus, the driving of the engine 21 is based on the limited power generation amount smaller than the discharging power generation amount. All things considered, the engine 21 is less likely to be overheated, even when internal pressure of the fuel tank 41 rises to or above the predetermined pressure while the cooling water is circulated with the engine 21 driven in the overheat preventing manner.

In the ECU 6 of the hybrid vehicle 1 according to one embodiment, when the internal pressure of the fuel tank 41 is equal to or higher than the predetermined pressure, the prioritizing unit compares the driving power generation amount, calculated by the first calculation unit, with the discharging power generation amount, and drives the engine 21 with a larger one of the power generation amounts. Thus, the combustion of the fuel evaporative gas discharged into the intake passage 26 of the engine 21 is facilitated, whereby the internal pressure of the fuel tank 41 can be swiftly reduced.

In the ECU 6 of the hybrid vehicle 1 according to one embodiment, the prioritizing unit compares the total power generation amount of the driving power generation amount, the charging power generation amount, and the air-conditioning power generation amount with the limited power generation amount, and prioritizes the limited power generation amount when the limited power generation amount is smaller. Thus, the engine 21 is driven with the limited power generation amount when the temperature of the cooling water is equal to or higher than the predetermined temperature. Thus, the engine is controlled based on the limited power generation amount to suppress generation of heat, whereby the temperature of the cooling water can be swiftly lowered.

In the ECU 6 of the hybrid vehicle 1 according to one embodiment, when the internal pressure of the fuel tank 41 is equal to or higher than the predetermined pressure, the prioritizing unit compares the total power generation amount of the driving power generation amount, the charging power generation amount, and the air-conditioning power generation amount with the discharging power generation amount, and prioritizes the total power generation amount when the total power generation amount is larger than the discharging power generation amount. Thus, the combustion of the fuel evaporative gas discharged into the intake passage 26 of the engine 21 is facilitated, whereby the internal pressure of the fuel tank 41 can be swiftly reduced.

In the ECU 6 of the hybrid vehicle 1 according to one embodiment, the limited power generation amount may be determined to be a fixed power generation amount, and the discharging power generation amount may be determined to be a fixed power generation amount larger than the limited power generation amount. Thus, the limited power generation amount may be determined to be a fixed power generation amount, and the discharging power generation amount may be determined to be a fixed power generation amount larger than the limited power generation amount, whereby the prioritizing unit causes the engine 21 to be driven with the limited power generation amount (fixed value) when the temperature of the cooling water is equal to or higher than the predetermined temperature, and causes the engine 21 to be driven with the discharging power generation amount (fixed value) when the temperature of the cooling water is lower than the predetermined temperature and the internal pressure of the fuel tank 41 is equal to or higher than the predetermined pressure. Thus, the control device of the hybrid vehicle can have a simple control-related configuration.

What is claimed is:

1. A control device for a hybrid vehicle including an internal combustion engine, the control device comprising:
   a processor and a non-transitory storage that stores a program that causes the processor to:
   limit, as a limiting unit, an output of the internal combustion engine while driving the internal combustion engine when temperature of cooling water for cooling the internal combustion engine is equal to or higher than a predetermined temperature;
   discharge, as a discharging unit, when internal pressure of a fuel tank is equal to or higher than predetermined pressure, fuel evaporative gas in the fuel tank into an intake path of the internal combustion engine while the internal combustion engine is being driven; and
   prioritize, as a prioritizing unit, the limiting of the output of the internal combustion engine over the discharging of the fuel evaporative gas, when discharging the fuel evaporative gas and limiting the output of the internal combustion engine.

2. The control device for a hybrid vehicle according to claim 1,
   wherein the hybrid vehicle includes a generator driven by the internal combustion engine,
   the control device further comprising an engine controller controlling the internal combustion engine based on a power generation amount of the generator,
   wherein the limiting step determines a first power generation amount employed for limiting the output of the internal combustion engine,
   wherein the discharging step determines a second power generation amount, as an output for driving the internal combustion engine, employed for discharging the fuel evaporative gas in the fuel tank into the intake path, and
   wherein the prioritizing step instructs to continue, when a request for driving the internal combustion engine with the second power generation amount is issued while the engine controller is driving the internal combustion engine with the first power generation amount, the driving of the internal combustion engine based on the first power generation amount.

3. The control device for a hybrid vehicle according to claim 2,
   wherein the hybrid vehicle is capable of driving a driving wheel of the hybrid vehicle with power generated by the generator,
   wherein the hybrid vehicle includes a first calculator that calculates a third power generation amount required for the driving, and
   wherein the prioritizing step compares the calculated third power generation amount with the second power generation amount, so that a larger one of the third power generation amount and the second power generation amount is employed for driving the internal combustion engine.

4. The control device for a hybrid vehicle according to claim 3,
   wherein the hybrid vehicle includes:

a driving battery storing power required for traveling;
an air conditioner device adjusting an environment in a cabin of the hybrid vehicle;
a second calculator calculating a fourth power generation amount required for charging the driving battery; and
a third calculator calculating a fifth power generation amount required for the air conditioner device, and
wherein the prioritizing step compares a total power generation amount of the third to the fifth power generation amounts with the first power generation amount, and prioritizes the first power generation amount when the first power generation amount is smaller.

5. The control device for a hybrid vehicle according to claim 4, wherein the prioritizing step compares a total power generation amount of the third to the fifth power generation amounts with the second power generation amount, and prioritizes the total power generation amount when the total power generation amount is larger than the second power generation amount.

6. The control device for a hybrid vehicle according to claim 2,
wherein the first power generation amount is determined to be a fixed power generation amount, and
wherein the second power generation amount is determined to be a fixed power generation amount that is larger than the first power generation amount.

7. The control device for a hybrid vehicle according to claim 3,
wherein the first power generation amount is determined to be a fixed power generation amount, and
wherein the second power generation amount is determined to be a fixed power generation amount that is larger than the first power generation amount.

* * * * *